(12) United States Patent
Carre et al.

(10) Patent No.: US 6,942,920 B2
(45) Date of Patent: Sep. 13, 2005

(54) GLASS-CERAMIC PLATES AND METHODS OF FABRICATING THEM

(75) Inventors: Alain R. E. Carre, Le Chatelet-en-Brie (FR); Celine C. Guermeur, Chartrettes (FR); Marianne Semjen, Veneux les Sablons (FR)

(73) Assignee: Eurokera, Chateau-Thierry (FR)

( * ) Notice: Subject to any disclaimer, the term of this patent is extended or adjusted under 35 U.S.C. 154(b) by 0 days.

(21) Appl. No.: 10/317,908

(22) Filed: Dec. 11, 2002

(65) Prior Publication Data

US 2003/0215642 A1 Nov. 20, 2003

Related U.S. Application Data

(63) Continuation of application No. PCT/EP02/14073, filed on Dec. 10, 2002.

(30) Foreign Application Priority Data

Dec. 11, 2001 (FR) .............................................. 01 15962

(51) Int. Cl.[7] ................................................. B32B 9/00
(52) U.S. Cl. ........................ 428/408; 428/698; 428/701; 428/702; 428/704; 428/446; 428/336; 428/216; 219/443.1
(58) Field of Search ................................ 428/408, 428, 428/698, 701, 702, 704, 446, 336, 216; 219/443.1, 465, 466.1; 392/309

(56) References Cited

U.S. PATENT DOCUMENTS

| | | | |
|---|---|---|---|
| 2,852,415 A | | 9/1958 | Colbert et al. |
| 4,527,050 A | * | 7/1985 | Kicherer ................ 219/448.17 |
| 5,508,092 A | * | 4/1996 | Kimock et al. ............. 428/216 |
| 5,665,424 A | | 9/1997 | Sherman |

FOREIGN PATENT DOCUMENTS

| | | |
|---|---|---|
| EP | 0 299 300 A | 1/1989 |
| EP | 0 518 755 A | 12/1992 |
| EP | 0 716 270 A | 6/1996 |
| WO | 0132578 A | 5/2001 |

* cited by examiner

Primary Examiner—Deborah Jones
Assistant Examiner—G. Blackwell-Rudasill
(74) Attorney, Agent, or Firm—Siwen Chen

(57) ABSTRACT

The invention relates to glass-ceramic plates, hotplates incorporating them and their fabrication process. The glass-ceramic plate of the invention is of the type having a bottom substrate layer and a top coating layer and is characterized in that the top coating layer covers at least the external top surface of the bottom glass-ceramic layer and is a layer of a hard substrate material chosen from the group constituted by silicon carbide, silicon oxycarbide, silicon nitride, silicon oxynitride and hydrogenated amorphous carbons. The invention finds an application in the fabrication of coated glass-ceramic plates and in particular in the fabrication of glass-ceramic hotplates.

12 Claims, 3 Drawing Sheets

GLASS-CERAMIC PLATES AND METHODS OF FABRICATING THEM

This application is a continuation of PCT/EP02/14073 filed Dec. 10, 2002.

FIELD OF THE INVENTION

The present invention relates to a coated glass-ceramic plate and to a method of fabricating this kind of plate. It also relates to a hotplate comprising this type of glass-ceramic plate and to a method of fabricating this type of hotplate.

BACKGROUND OF THE INVENTION

Sales of glass-ceramic hotplates have been growing continuously for several years.

The glass-ceramic hotplates can be electric hotplates. The plates are flat plates that are initially made from a glass-ceramic precursor and then ceramicized.

The hotplates can also be halogen or induction hotplates.

However, this kind of glass-ceramic hotplate is also produced for gas cookers or combined hobs, in particular combined gas/electric hobs. Openings must be provided in this type of plate for gas burners to pass through. The diameter of the openings is made sufficiently large, compared to the diameters of the burners, for the burners to be fitted without forcing them, so that there is therefore no risk of breaking the plate. The diameter is generally from 40 millimeters (mm) to 95 mm.

Smaller openings can also be provided in all types of plate, in particular for fitting control knobs.

Glass-ceramic hotplates have been increasingly successful over the past several years, in particular because of their attractive appearance and because they are easy to clean.

Their appearance can be further improved by applying a decorative coating, generally of enamel.

Nevertheless, all existing glass-ceramic plates still have some drawbacks in use. In particular, they scratch easily because of friction with saucepans and cleaning scourers. They are also easily discolored because of friction with metals.

Another drawback is that food still sticks to the plates too easily, which leads the user to clean them with scourers, causing further scratches.

The invention aims to alleviate those drawbacks by proposing a glass-ceramic plate that has an improved hardness and scratch-resistance, which has a reduced coefficient of friction to reduce discoloration caused by metals, and has a reduced adhesion of food to these surfaces, without compromising their efficiency and attractive appearance.

SUMMARY OF THE INVENTION

To this end, the invention proposes a glass-ceramic plate of the type comprising a bottom substrate layer which is made of a glass-ceramic and covered with a coating layer, characterized in that the coating layer covers at least the external top surface of the glass-ceramic layer and comprises at least one layer of a hard material chosen from the group constituted by silicon carbide, silicon oxycarbide, silicon nitride, silicon oxynitride and hydrogenated amorphous carbons.

In a first embodiment the coating layer is deposited directly on the external top surface of the glass-ceramic layer.

In a second embodiment, the glass-ceramic plate according to the invention further comprises an intermediate layer of silicon oxynitride between the bottom glass-ceramic substrate layer and the top hard material coating layer.

In a first variant of the second embodiment the silicon oxynitride intermediate layer further contains carbon.

In a second variant of the second embodiment the intermediate layer is a layer of silicon oxynitride with a carbon concentration gradient in the direction of its thickness.

If the top coating layer is a layer of silicon carbide or hydrogenated amorphous carbon, the intermediate layer is preferably a layer of silicon oxynitride having a carbon concentration gradient increasing in the direction of its thickness from the bottom glass-ceramic substrate layer to the top coating layer.

In all cases the top layer forming the coating preferably has a thickness from 1 micrometer ($\mu$m) to 20 $\mu$m.

However, the top coating layer most preferably has a thickness of 2 $\mu$m.

The intermediate layer preferably has a thickness approximately equal to one quarter of the thickness of the top coating layer.

In a first embodiment the top coating layer and where applicable the intermediate layer cover all the external surfaces of the bottom glass-ceramic substrate layer.

In a second embodiment the top coating layer and where applicable the intermediate layer cover only the top surface of the bottom glass-ceramic substrate layer.

In a third embodiment the top coating layer and where applicable the intermediate layer cover the top surface and the vertical walls of the bottom glass-ceramic substrate layer.

The glass-ceramic plate according to the invention can further include openings forming fluid passages.

In this case, in a preferred embodiment, the walls of these passages are coated with said coating.

The invention also proposes a hotplate characterized in that it comprises a glass-ceramic plate according to the invention.

The invention further proposes a method of fabricating a glass-ceramic plate of the type comprising a bottom glass-ceramic layer and a top coating layer, which method is characterized in that it comprises the following steps:

a) forming a bottom glass-ceramic substrate layer to the required shape, and b) forming on at least the top surface of the substrate layer an external top coating layer of a hard material chosen from the group constituted by silicon carbide, silicon oxycarbide, silicon nitride, silicon oxynitride and hydrogenated amorphous carbons.

In a first embodiment the external coating layer is deposited directly on the substrate layer.

In a second embodiment the method according to the invention further comprises a step of forming a silicon oxynitride intermediate layer between the glass-ceramic substrate layer and the hard material coating layer.

In a first variant of the second embodiment the intermediate layer is a layer of silicon oxynitride further containing carbon.

In a second variant of the second embodiment the intermediate layer is a layer of silicon oxynitride having a carbon concentration gradient in the direction of its thickness.

When the top coating layer is a layer, in particular, made of silicon carbide or hydrogenated amorphous carbon, the intermediate layer is preferably a layer of silicon oxynitride having a carbon concentration gradient increasing in the direction of its thickness from the bottom glass-ceramic substrate layer to the top coating layer.

In all cases the top external coating layer has a thickness from 1 µm to 20 µm.

However, the top coating layer preferably has a thickness of approximately 2 µm.

The intermediate layer preferably has a thickness equal to approximately one quarter of the thickness of the top coating layer.

The top coating layer and/or the intermediate layer are preferably formed by plasma-assisted chemical vapor phase deposition.

In a first embodiment of the method according to the invention the top coating layer and/or the intermediate layer are formed only on the top face of the bottom substrate layer.

In a second embodiment of the method according to the invention the top coating layer and/or the intermediate layer are formed on the top face and the external walls of the bottom substrate layer.

In a third embodiment of the method according to the invention the top coating layer and/or the intermediate layer are formed on all the external surfaces of the bottom substrate layer.

The invention finally proposes a method of fabricating hotplates characterized in that it comprises the steps of the method of fabricating a glass-ceramic plate according to the invention.

BRIEF DESCRIPTION OF THE DRAWINGS

The invention will be better understood and other features and advantages will become clearly apparent after reading the following explanatory description, which is given with reference to the accompanying drawings, in which.

DETAILED DESCRIPTION OF THE INVENTION

All the photographs in FIGS. 5a, 5b, 5c and 5d were processed under the same conditions.

The invention aims to provide glass-ceramic plates, in particular for fabricating glass-ceramic hotplates having improved resistance to scratching and to discoloration caused by metals or food, whilst retaining their aesthetic, strength, and thermal stability qualities.

To this end, the invention proposes to coat the glass-ceramic plate with a hard material coating having a low coefficient of friction. The coating must also adhere to the glass-ceramic plate without delaminating and must not be thermally degraded at the temperatures at which the glass-ceramic plate is used, in particular at temperatures greater than or equal to 400° C. in the case of glass-ceramic hotplates.

It has now been found that a coating of the above kind and having all the above properties can be provided by a coating of a material chosen from the group constituted by silicon carbide, silicon oxycarbide, silicon nitride, silicon oxynitride and hard-hydrogenated amorphous carbons. Hard hydrogenated amorphous carbons are also known as diamond-like coatings (DLC). DLC can contain dopants such as nitrogen, boron and silicon.

Figure 1:
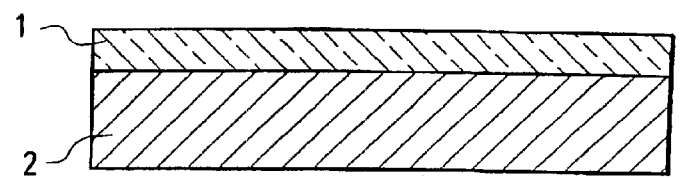
FIG. 1 is a diagrammatic view in section of a glass-ceramic plate conforming to a first embodiment of the invention.

In a first embodiment, shown in FIG. 1, the top hard material coating layer, denoted 1 in FIG. 1, can be deposited directly on the top surface of the bottom glass-ceramic substrate layer, denoted 2 in FIG. 1, in particular if the top layer 1 is of silicon carbide, silicon oxycarbide, silicon nitride or silicon oxynitride.

Figure 2:
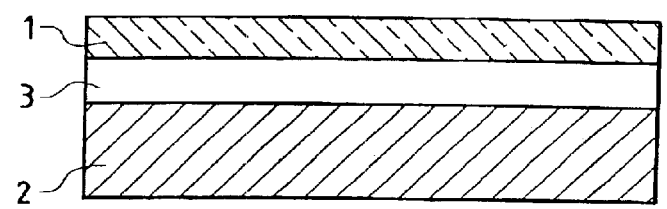
FIG. 2 is a diagrammatic view in section of a glass-ceramic plate conforming to a second embodiment of the invention.

However, to improve adhesion and to prevent delamination of the coating layer 1, in particular when it contains carbon, i.e. when it is a layer of silicon carbide or oxycarbide or hydrogenated amorphous carbon, and more particularly when it is a layer of hydrogenated amorphous carbon, it is preferable, as shown in FIG. 2, to deposit an intermediate silicon oxynitride layer, denoted 3 in FIG. 2, between the bottom glass-ceramic substrate layer, denoted 2 in FIG. 2, and the top hard material coating layer, denoted 1 in FIG. 2.

But such an intermediate layer can also be used for improving adhesion and preventing delamination of the coating layer when this latter is made of silicon nitride or silicon oxynitride.

To improve the compatibility between the bottom substrate layer 2 and the top coating layer 1 the intermediate layer can be a layer of silicon oxynitride further containing carbon.

The presence of carbon is beneficial to prevent delamination at the temperatures at which the glass-ceramic plates are used, in particular when they are used to fabricate hotplates.

Thus the intermediate layer can be a layer of silicon oxynitride having a homogeneous carbon concentration or a layer of silicon oxynitride having a carbon concentration gradient in the direction of its thickness.

Figure 3:
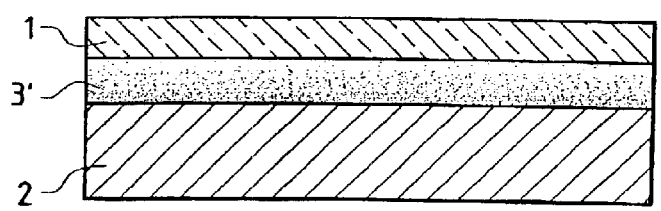
FIG. 3 is a diagrammatic view in section of a glass-ceramic plate conforming to a third embodiment of the invention.

As shown in FIG. 3, to improve adhesion and prevent delamination in particular when the top coating layer 1 is a layer of silicon carbide or hydrogenated amorphous carbon, the intermediate layer, denoted 3' in FIG. 3, is preferably a layer of silicon oxynitride having a carbon concentration increasing in the direction of its thickness from the bottom glass-ceramic substrate layer, denoted 2 in FIG. 3, to the top silicon carbide or hydrogenated amorphous carbon coating layer 1. In other words, the carbon concentration in the intermediate layer 3' is higher in the vicinity of the coating 1 and lower or practically zero in the vicinity of the glass-ceramic substrate 2.

When the top coating layer 1 is a layer of hydrogenated amorphous carbon, dopants can be introduced to improve some of its properties, such as its thermal stability, for example.

Suitable dopants include silicon, boron and nitrogen.

The coating layer 1 and the intermediate layer 3, 3' can be deposited by any method known to the person skilled in the art, such as vacuum sputtering. The top coating layer 1 and the intermediate layer 3, 3', when present, are preferably deposited by a plasma-assisted chemical vapor phase deposition process.

Their thickness is preferably from 1 µm to 20 µm. They are preferably 2 µm thick.

The thickness of the intermediate layer 3, 3' is preferably one quarter of the thickness of the top coating layer 1.

As already mentioned, glass-ceramic plates are used in particular to fabricate hotplates.

These plates can be flat plates. The flat plates can be coated only on their top surface, which comes into contact with cooking vessels, food and cleaning scourers, or over the whole of their external surfaces.

All hotplates can incorporate openings for control knobs.

However, hotplates, especially gas hotplates, must include openings for the passage of the gaseous fluid.

In this case, the top coating layer 1 and the intermediate layer 3, 3', when present, can coat only the top surface, which comes into contact with cooking vessels. Nevertheless, it can be particularly beneficial also to cover the vertical walls defining such openings, in particular because the openings need to be cleaned with scourers and food can spill into them.

Alternatively, the whole of the external surfaces of the glass-ceramic substrate plate 2 can be coated.

EXAMPLES

In order that the invention may be understood better, several embodiments will now be described with the aid of purely illustrative and non-limiting examples.

Example 1

As shown in FIG. 1, a flat glass-ceramic plate denoted 1 was coated by vacuum sputtering with a top layer of silicon nitride denoted 2. The thickness of the top layer 2 was 2 µm.

A glass-ceramic plate according to the invention was then obtained.

Example 2

In this example, a flat glass ceramic plate was coated with a top layer of silicon nitride by a plasma-assisted chemical vapor phase deposition process.

The thickness of the top layer was 2 µm.

A glass-ceramic plate according to the invention was obtained.

KNOOP hardness was measured on the plates obtained in examples 1 and 2 and also, by way of comparison, on the bottom glass-ceramic substrate layer 2 not coated with the top layer 1.

The results are set out in Table 1 below.

TABLE 1

|  | LOAD | KNOOP HARDNESS |
|---|---|---|
| Glass-ceramic plate from Example 1 | 50 g | 1335 |
| Glass-ceramic plate from Example 1 | 100 g | 900 |
| Glass-ceramic plate from Example 2 | 50 g | 1400 |
| Uncoated glass-ceramic plate | 50 g | 700 |
| Uncoated glass-ceramic plate | 100 g | 640 |

The results of the KNOOP hardness measurements show that the glass-ceramic plate according to the invention obtained in examples 1 and 2 was harder than the prior art glass-ceramic plate. Nevertheless, the glass-ceramic plates according to the invention, i.e. those coated with silicon nitride, were softer than a layer of silicon nitride on its own, which by way of comparison had a hardness of 2 600 for a 50 gram (g) load.

In the case of a thin coating, the hardness measured by the KNOOP micro-indentation method is that of the "coating-substrate" composite, not that of the coating alone.

This is because, if hard films from 1 µm to 10 µm thick are deposited on a softer substrate, plastic deformation of the substrate occurs during the KNOOP test, reducing the measured hardness values. The hardness of a thin coating is therefore greatly dependent on the hardness of the substrate, the thickness of the coating and the indentation load. It has been determined that a thickness of 2 µm is appropriate for the top coating layer.

The abrasion resistance of the glass-ceramic plate according to the invention was then tested.

The abrasion resistance of the surface of the sample was tested using a standard polishing machine. A disk of 3M Scotch Brite® replaced the abrasive material. The pressure applied was approximately 5×10−3 kilograms per square millimeter (mg/mm2) and the sample under test was rotated at 200 rpm for one minute. The scratches were observed visually with an optical microscope. The sample was then classified by comparing the magnitude of the scratches, i.e. their width, depth and density, to that of a prior art glass-ceramic plate that had been subjected to abrasion on the same experimental set-up and under the same conditions.

The glass-ceramic plate according to the invention obtained in Example 2 showed no signs of scratching after the abrasion resistance test.

Figure 5A:
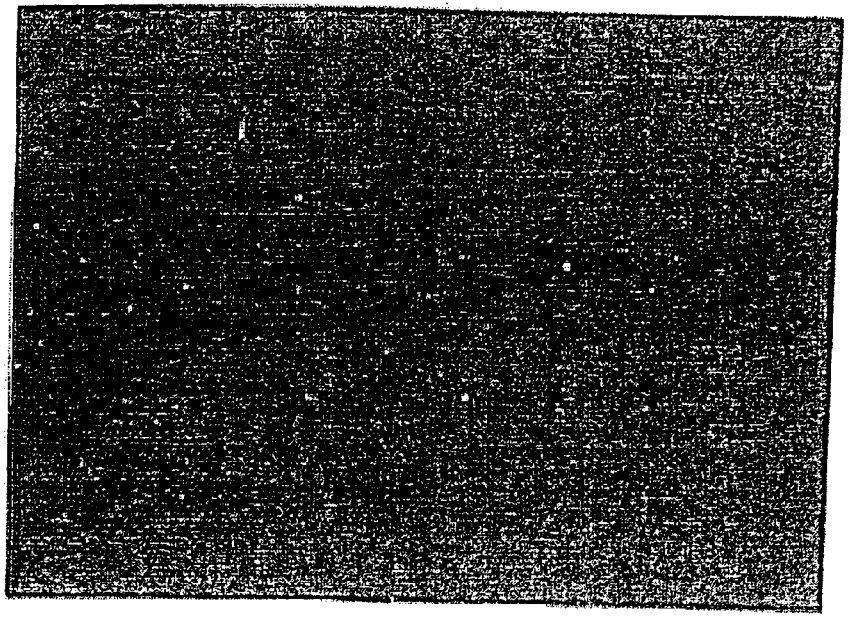
FIG. 5a is a photograph of a first point on a glass-ceramic plate according to the invention after an abrasion resistance test.
Figure 5B:
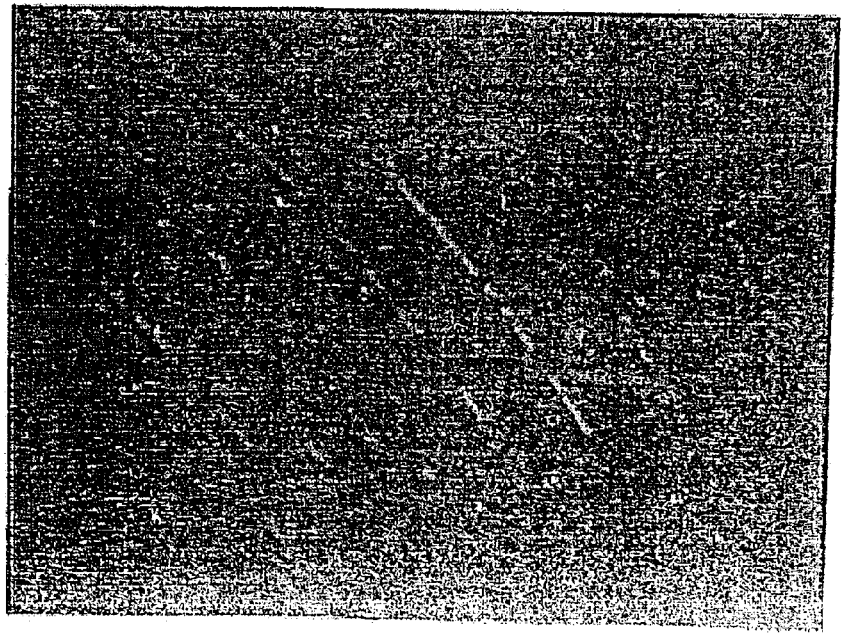
FIG. 5b is a photograph of another point on the same glass-ceramic plate according to the invention, shown in FIG. 5a, after the same abrasion test.

FIGS. 5a and 5b show the results of the abrasion test on the glass-ceramic plate according to the invention obtained in Example 1; FIG. 5a is a photograph of a first location on the plate according to the invention obtained in Example 1 and FIG. 5b is a photograph of a second location on the same plate after the abrasion test.

By way of comparison, the same abrasion resistance test was carried out on a prior art glass-ceramic plate, i.e. a plate with no coating.

Figure 5C:
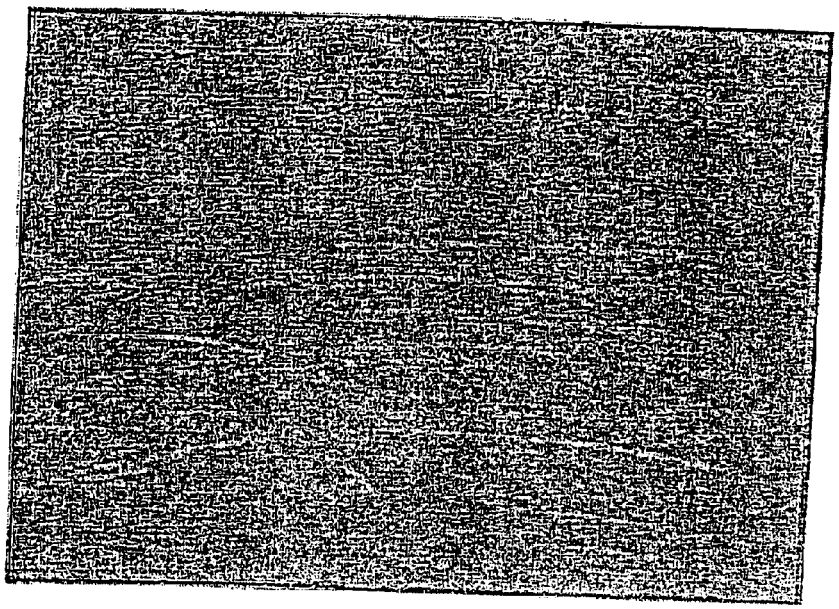
FIG. 5c shows a first point on a prior art glass-ceramic plate after the same abrasion test as applied to the glass-ceramic plate according to the invention.
Figure 5D:
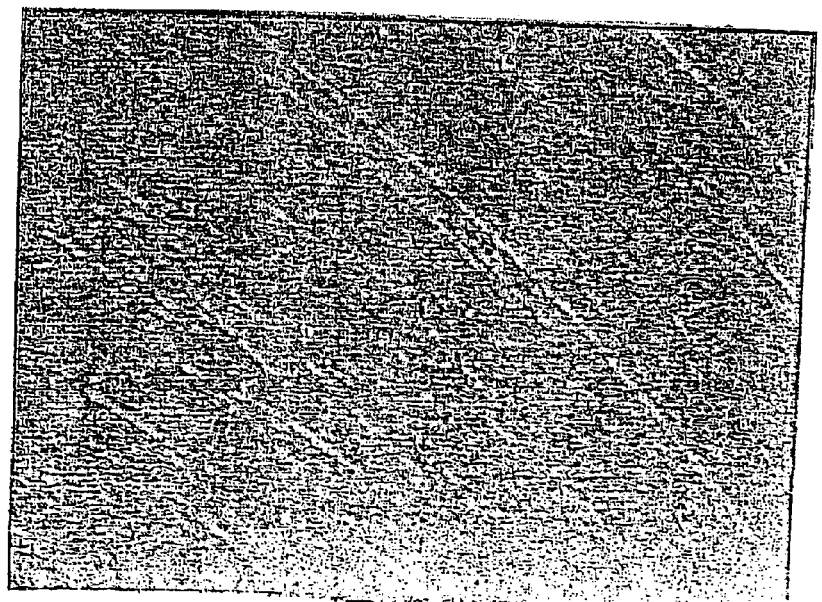
FIG. 5d is a photograph of a second point on the prior art glass-ceramic plate shown in FIG. 5C, after the same abrasion test.

FIGS. 5c and 5d are photographs of two different locations on the prior art plate after the abrasion resistance test.

As can be seen by comparing FIGS. 5a and 5b with FIGS. 5c and 5d, the glass-ceramic plate according to the invention had better abrasion resistance.

The behavior of glass-ceramic plates of the invention in terms of food adhesion was also tested.

The test consisted of burning a mixture of foods directly on the glass-ceramic plate of the invention for 10 minutes at 650° C. and then cleaning the plate.

It was found that the silicon nitride coating prevented or at least reduced the formation of scratches during cleaning after the test. Also, no delamination of the coating was observed during the test.

Example 3

A 2 µm thick hydrogenated amorphous carbon coating was deposited on the top face of a glass-ceramic plate using a plasma-assisted chemical vapor phase deposition process.

A glass-ceramic plate according to the invention was obtained.

The same hardness and abrasion resistance tests previously described were applied to this sample. The results obtained showed that the scratch resistance was good and that the abrasion resistance was improved.

Nevertheless, during the test involving burning a mixture of foods directly on the hotplate comprising the coated glass-ceramic plate in accordance with the invention, the adhesion between the hydrogenated amorphous carbon coating and its glass-ceramic support was not sufficient, and lead to delamination of the coating when measuring the hardness and during the abrasion test.

Hydrogenated amorphous carbon coatings are nevertheless of benefit because they have a very low coefficient of friction and good abrasion resistance. Adhesion was then improved in the manner explained in Examples 4 and 5 below.

Example 4

The sample for Example 4 was obtained in the manner shown in FIG. 2.

A 0.5 µm thick intermediate layer 3 of silicon oxynitride was then deposited on the top surface of the glass-ceramic support layer 2.

The silicon oxynitride layer was deposited by vacuum sputtering.

A 2 µm thick layer of hydrogenated amorphous carbon was then deposited on the free top surface of the intermediate layer 3 by a plasma-assisted chemical vapor phase deposition process.

A glass-ceramic plate according to the invention was then obtained.

Adhesion was then good and the results of the hardness and abrasion resistance tests previously described were also good.

Example 5

A sample of coated glass-ceramic plate according to the invention was obtained in the manner shown in FIG. 3.

An intermediate layer 3' of silicon oxynitride containing carbon was deposited on the top surface of the glass-ceramic substrate layer 2. The layer 3' had a carbon concentration gradient increasing in the direction of its thickness from the substrate layer 2 to its top surface. The hydrogenated amorphous carbon coating was deposited on the top surface of the intermediate layer 3'.

Once again, the intermediate layer 3' had a thickness of 0.5 µm and the coating layer 1 had a thickness of 2 µm.

A glass-ceramic plate according to the invention was obtained.

The results obtained after carrying out the hardness and abrasion resistance tests previously described on this plate were good.

Hydrogenated amorphous carbon coatings are degraded thermally at temperatures above approximately 400° C. To improve the thermal properties of coated glass-ceramic plates according to the invention, it is possible to add dopants to the hydrogenated amorphous carbon coating. This improves their thermal stability in particular.

Example 6

The top surface of a bottom glass-ceramic substrate layer 2 was coated with a 2 µm thick silicon carbide coating.

A glass-ceramic plate according to the invention was obtained.

The results of the hardness and abrasion resistance tests previously described were good.

Example 7

A glass-ceramic hotplate suitable for gas cookers was first fabricated.

Figure 4:
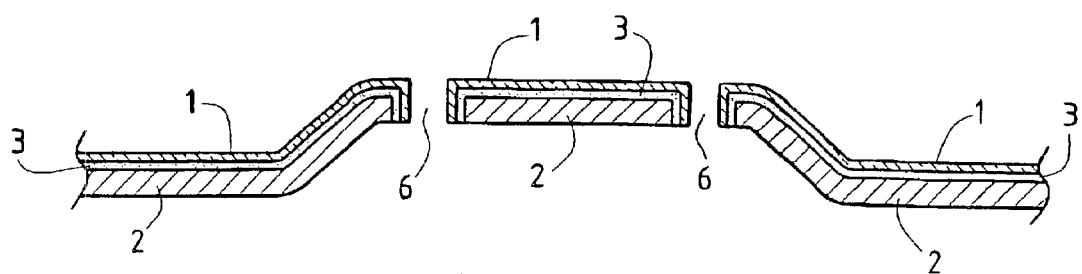
FIG. 4 is a diagrammatic view in section of a glass-ceramic gas hotplate.

As shown in FIG. 4, the hotplate included passages 6 for the gaseous fluid and raised portions for supporting cooking vessels.

The top surface, the vertical external walls and the vertical walls delimiting the passages 6 of the glass-ceramic hotplate were coated with an intermediate layer 3 of silicon oxynitride having a homogeneous carbon concentration.

A coating layer 1 of hydrogenated amorphous carbon was deposited on the layer 3 and therefore coated the flat external surfaces and all the vertical walls of the glass-ceramic support plate 2.

The hotplate in accordance with the invention obtained in this way was used as a gas hotplate without problems.

Of course, the invention is in no way limited to the embodiments described and shown, which are provided by way of example only.

Accordingly, other materials containing silicon and/or carbon and/or nitrogen can be used to form the intermediate layer, as will be clearly apparent to the person skilled in the art.

Equally, although the hotplate according to the invention has been described as comprising an intermediate layer 3 and a top coating layer 1 covering the top face and vertical walls of the hotplate, only one coating layer could be used, namely the hard material coating layer in accordance with the invention.

Equally, only the flat parts that come into contact with cooking vessels could be coated.

Although the silicon oxynitride intermediate layer 3' has been described as having a carbon concentration gradient increasing from the glass-ceramic layer 2 to the hard material layer 1, it will be clearly apparent to the person skilled in the art that a silicon oxynitride intermediate layer having a carbon concentration gradient decreasing from the hard material layer to the glass-ceramic layer 2 could equally well be used.

Of course, the bottom substrate layer 2 could equally well be coated over all its external surfaces.

The invention encompasses all technical equivalents of the means described as well as combinations thereof within the spirit of the invention.

What is claimed is:

1. A glass-ceramic plate of the type comprising a bottom glass ceramic substrate layer covered with a coating and an intermediate layer, wherein the top coating layer (1) is made of a hard material chosen from the group consisting of silicon carbide, silicon oxycarbide, silicon nitride, silicon oxynitride and hydrogenated amorphous carbons;

the intermediate layer (3, 3') is comprised of silicon oxynitride and is positioned between the bottom glass-ceramic substrate layer (2) and the top hard material coaling layer (1), characterized in that the silicon oxynitride intermediate layer further contains carbon.

2. A glass-ceramic plate according to claim 1, characterized in that the intermediate layer (3') is a layer of silicon oxynitride with a carbon concentration gradient in the direction of its thickness.

3. A glass-ceramic plate according to claim 2, characterized in that the intermediate layer (3') is a layer of silicon oxynitride having a carbon concentration gradient increasing in the direction of its thickness from the bottom glass-ceramic substrate layer (2) to the top coating layer (1).

4. A glass-ceramic plate according to claim 1, characterized in that the top coating layer (1) has a thickness from 1 µm to 20 µm.

5. A glass-ceramic plate according claim 4, characterized in that the top coating layer (1) has a thickness of 2 µm.

6. A glass-ceramic plate according to claim 1, characterized in that the intermediate layer (3, 3') has a thickness approximately equal to one quarter of the thickness of the top coating layer (1).

7. A glass-ceramic plate according to claim 1, characterized in that the top coating layer (1) and the intermediate layer (3, 3') cover all the external surfaces of the bottom glass-ceramic substrate layer (2).

8. A glass-ceramic plate according to claim 1, characterized in that the top coating layer (1) and the intermediate layer (3, 3') cover only the top surface of the bottom glass-ceramic substrate layer (2).

9. A glass-ceramic plate according to claim 1, characterized in that the top coating layer (1) and the intermediate layer (3, 3') cover the top surface and the vertical walls of the bottom glass-ceramic substrate layer (2).

10. A glass-ceramic plate according to claim 1, characterized in that it comprises openings (6) forming fluid passages.

11. A glass-ceramic plate according to claim 10, characterized in that the walls of the openings (6) are coated with the top coating layer (1) and the intermediate layer (3, 3').

12. A hotplate characterized in that it comprises a glass-ceramic plate according to claim 1.

* * * * *